Nov. 17, 1936.    J. L. TAYLOR    2,060,958
STATIC BALANCING MACHINE
Filed Dec. 5, 1932    2 Sheets—Sheet 1
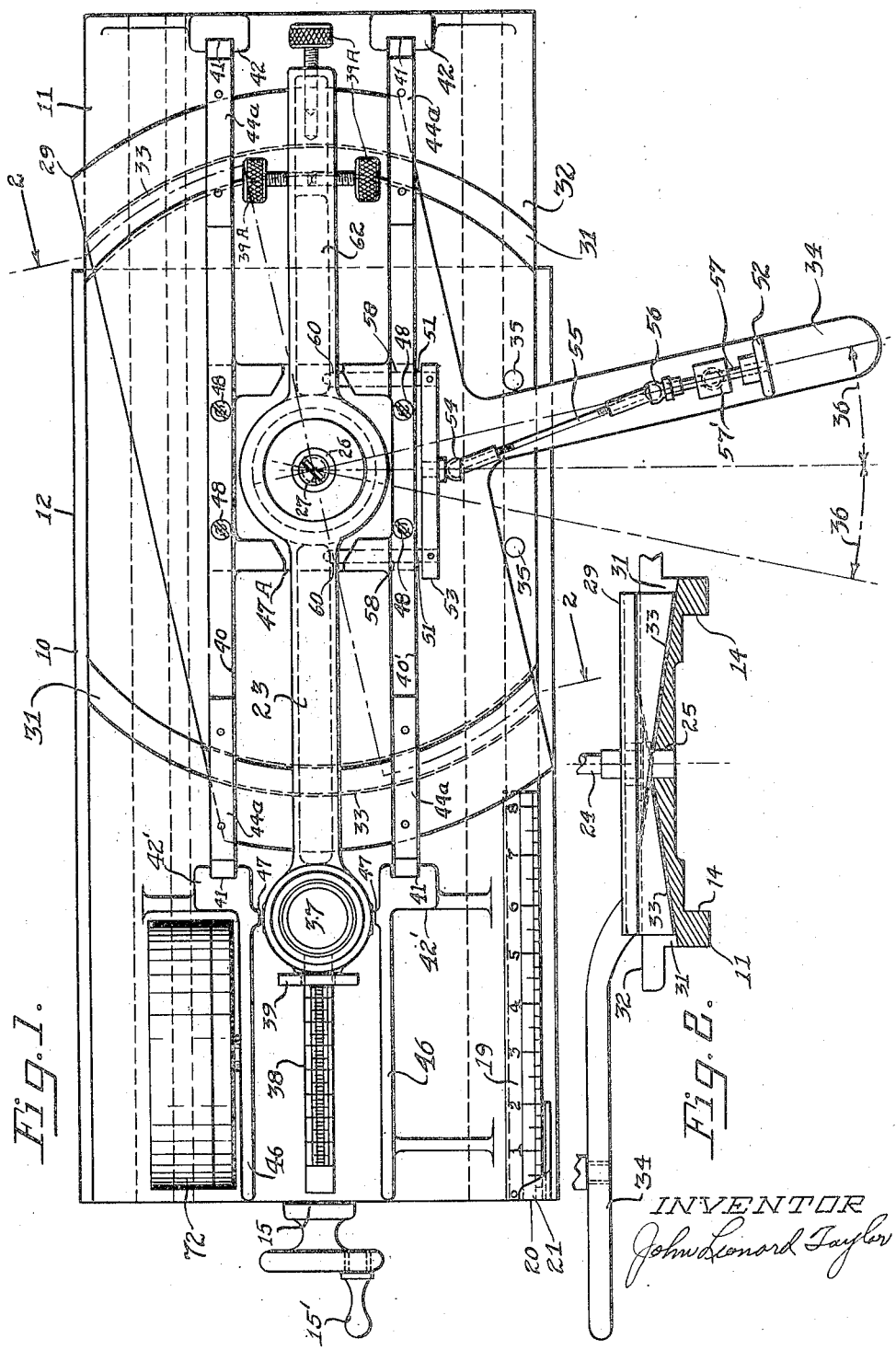

Nov. 17, 1936.  J. L. TAYLOR  2,060,958
STATIC BALANCING MACHINE
Filed Dec. 5, 1932   2 Sheets-Sheet 2
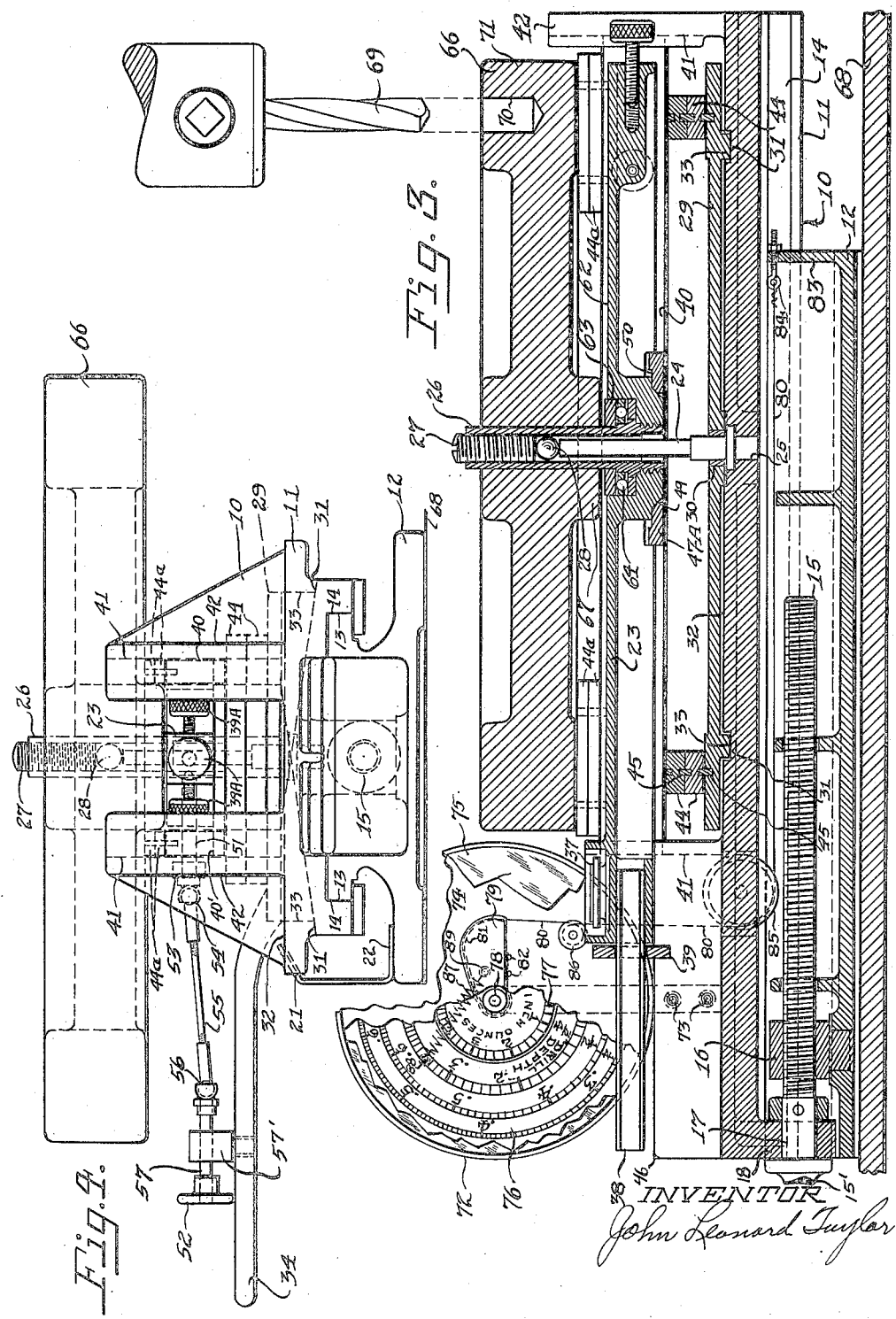
INVENTOR
John Leonard Taylor Patented Nov. 17, 1936

2,060,958

UNITED STATES PATENT OFFICE 2,060,958

STATIC BALANCING MACHINE

John Leonard Taylor, Milwaukee, Wis.

Application December 5, 1932, Serial No. 645,675

14 Claims. (Cl. 73—51)

My invention relates to improvements in static balancing machines, and more particularly to apparatus for quickly checking for the correct balance and for truing up unbalanced machine parts particularly such as usually rotate at high speeds, such as flywheels, speed reduction gearsets, parts of steam turbines, centrifugal pumps and the like, and has special reference to the provision of means for quickly indicating the exact amount, by weight, which a given machine part is out of balance, together with provisions for quickly correcting and rechecking the balance thereof.

An object of the invention is to generally improve the construction and operation of devices of this class.

A further object is to provide such a device which will operate with increased speed and certainty.

More particularly, an object of the invention is to provide a device for accurately balancing machine parts and the like which are intended to be accurately dynamically symmetrical.

A further object is to provide such a device which will indicate immediately approximately where a part is too heavy.

A further object is to provide such a device which will measure the amount of such excess weight.

A further object is to provide such a device which will calculate the amount of material to be removed at any predetermined convenient distance from the center of the machine part in order to correct the unbalanced condition.

A further object is to provide such a device having a tilting support member to which a work piece may be attached.

A further object is to provide such a support which is so constituted as to tilt when carrying a work piece which is not accurately balanced.

A further object is to provide instrumentalities responsive to such tilting which will indciate the location of unbalanced weight in a work piece.

A further object is to provide means for leveling said support with an unbalanced work piece in place thereon.

A further object is to provide such means which will indicate the moment of such unbalanced weight.

A further object is to provide means for shifting said support bodily for measured distances.

A further object is to provide calculating means operable by such shifting to determine from the previously determined moment of the unbalanced weight the amount of material which must be removed from said work piece at a distance from the center thereof equal to the distance shifted.

A further object is to provide such a device which will determine the depth of drilling necessary with various sizes of drills to remove the necessary amount of material.

A further object is to provide means for locking the tilting support against movement.

A further object is to provide means for supporting a work piece independently of said tilting support.

A further object is to provide for advancing and retracting said means whereby said work piece can be tested, drilled, retested, etc. without removing it from said tilting support.

A further object of this invention is to provide novel facilities for the rapid testing of machine and engine parts and the like as a part of the rapid quantity manufacture thereof, to provide for the determination at a glance, how much, if any, by weight, each part is out of balance, to find the exact location, circumferentially, of the unbalanced portion thereof, to afford novel facilities for quickly correcting any unbalance by removing such unbalanced weight so as to quickly render the said part in exact balance, and to enable the operator to quickly recheck the part for correct balance after the said unbalanced weight has been removed.

A further object of the invention is to provide a novel machine of relatively low cost of construction and simple operation, having the characteristic of being accurate, rapid and of high utility.

Further objects and advantages of the invention will appear more fully hereinafter.

The invention consists in the general combination of parts and details hereinafter described, all of which contribute to produce an efficient, universal static balancing machine.

A preferred embodiment of the invention is described in the following specification, while the broad scope of the invention is pointed out in the appended claims.

In the drawings:—

Figure 1 is a plan view of the entire machine.

Figure 2 is a vertical sectional view of the carriage, drawn on the lines 2—2 of Figure 1, and showing an end view of the adjustable table.

Figure 3 is a central, longitudinal, vertical section of the entire machine, and Figure 4 is an end view of the same.

Like parts are identified by the same reference numerals throughout the several views of the drawings and throughout the specification.

The machine generically designated by numeral 10 has a carriage 11 arranged for longitudinal travel upon a base 12, through guide ways 13, 13 of the base fitting into channels 14, 14 of the carriage, as particularly indicated in Figures 3 and 4.

The carriage 11 is longitudinally adjustable upon the base 12 by means of an interconnecting adjusting screw 15, provided with suitable actuating means, in the present instance indicated as the manually operated handle 15'. The screw 15 has threaded connection with the base 12, through a nut 16 suitably fixed with the base, and with the carriage, through the head 17 positioned and journaled in a lug 18 of the carriage.

A scale 19, Figure 1, graduated in inches or other convenient units, is provided at 20 on the carriage, and an index arm 21, in register with the scale 19, is affixed by any suitable means at 22 to the base 12 to indicate the exact position of endwise travel (in inches or other units and fractions thereof) of the carriage with respect to the base.

A cradle-balance 23, Figure 3, is horizontally balanced and pivotally supported above and from the carriage 11, through a flat top column 24, rigid with carriage 11, and in the present instance affixed in a bore 25 centrally in said carriage, the cradle having an upwardly extending tubular mandrel or spindle 26, enclosing the column and provided with a set screw or abutment 27 and a pivot ball or ball bearing 28 closely fitted and slidable in said mandrel. The mandrel 26 is rigidly affixed at its lower end portion to the cradle-beam 23, concentrically with the column 24. The set screw 27 has a flat bottom and is threaded into the upper end portion of the mandrel 26 and provides for the vertical adjustment of the cradle-beam with respect to a horizontal table or support 29, arranged on the carriage.

Screw 27 provides a means for vertically adjusting the pivot or fulcrum relatively to the cradle beam and the work piece. This screw is adjusted to so locate the pivot that the cradle and its load may come to rest with the center of gravity of the whole mass at or slightly below the pivot point. This adjustment may be readily determined by experiment for any given type of work piece, the screw being adjusted to raise the cradle, with the work piece in place, as much as possible without destroying the material stability of the assembly. If this is done with a previously balanced work piece, there will be a point in the upward adjustment of the cradle where the whole will tilt to one side and remain so tilted. This indicates that the center of gravity has been raised above the fulcrum, and the mass is in an unstable condition. Slightly lowering the mass from this point by means of screw 27 corrects this condition and gives the desired adjustment.

It is to be understood that the particular construction of the pivot including the ball 28, screw 27, and column 24 is not essential to the broader aspects of the present invention, and that any equivalent type of pivot is contemplated as being adaptable to be used and as being within the scope of the present invention. The type disclosed is preferred as it is accurate, produces a minimum of friction and is inexpensive.

The table 29 is also centrally pivoted about column 24, having a bore 30 by which it is journaled to the column 24, and it is arranged so as to be vertically adjustable with respect to its supporting carriage 11. Any suitable means may be provided to perform this adjustment, but in this present instance the horizontal floor 32 of the carriage has a pair of arcuately shaped grooves or channels 31, 31 concentrically arranged with respect to column 24, and the bottom surfaces of said channels are sloped, respectively, in opposite directions transversely in relation to the floor 32 of the carriage, as is shown in Figure 2. The table 29 has a pair of arcuately shaped tongues 33, 33 which are also arranged concentrically with the bore 30. The bottom surfaces of said tongues 33, 33 are sloped in opposite directions, respectively, transversely with respect to the bottom surface of the table 29. The tongues 33 are arranged to register with said channels 31 when the table is in place on column 24, and the slope of the bottom surfaces of the tongues 33, 33, respectively, is complementary to the bottom surfaces of the channels whereby said sloping surfaces interact to raise and lower the table upon partial rotation thereof. The adjustable table 29 is further provided with rotating means of suitable type such as an operating handle 34, which with the table may be partially rotated manually, between a pair of travel-limiting studs 35, 35, as indicated by the arrows 36, 36 of Figure 1, the handle engaging alternate studs upon movement into opposite extreme positions.

It will now be obvious that when said handle 34 is manually moved in either horizontal direction of partial rotation, as indicated by the arrows 36, 36 of Figure 1, the adjustable table 29 will either be slightly raised or lowered, as desired by the operator, with respect to the floor 32 of the carriage 11, for a purpose which will be hereinafter fully explained.

The cradle-balance 23 is provided with a universally indicating spirit level 37 and a specially graduated balancing-arm 38 carrying a weight 39 movably arranged therewith, operatively connected upon one arm of the beam 23, and near its opposite end adjustable balancing screws 39A are provided for the initial and any necessary subsequent adjustments to maintain the unloaded cradle in equilibrium horizontally.

The carriage 11 is further provided with a pair of parallel, horizontal, rectangular bars 40, 40' arranged longitudinally of the carriage, on opposite sides of the cradle-beam 23, and supported from the table 29. The ends of the parallel bars 40, 40' are respectively slidably fitted in vertical channels 41, 41 therefor provided in vertical guide posts 42, 42' affixed to the floor 32 of the carriage 11.

The bars 40, 40' may rest directly upon the table 29, or they may be supported horizontally upon a plurality of shims 44, 44, removably dowelled or otherwise fixed together and to the platform as for example by dowels 45, 45, as shown in Figure 3. The bars 40, 40' may also have, when required, shims 44a resting on top, and doweled in the same manner as shims 44, to accommodate various work hub dimensions.

A pair of parallel vertical walls 46, 46, Figure 1 are in the present instance preferably cast integral with the carriage 11 and with the vertical guideposts 42, 42', and arranged on opposite sides longitudinally of the cradle-balance 23 to protect the same from accidental damage. These walls 46, 46 have a pair of diametrically opposed abutments 47, 47 integrally cast with or otherwise suitably fixed with said walls and laterally arranged in the present instance with respect to the spirit level case, at a slight distance apart therefrom, to maintain the cradle-balance in spaced longitudinal alignment with the machine and yet permit the proper and free functioning of the cradle-balance 23 together with the universal spirit level 37 carried thereon.

The pair of parallel bars 40, 40' are rigidly connected together centrally thereof by means of a transverse crosshead 47a suitably fixed upon the underside of the bars, as for example, by the screws 48, 48, the whole constituting a work rest frame for carrying the weight of the work piece and other stresses incident to the drilling thereof. The crosshead 47a has a conical seat 49 and a flat horizontal circular seat 50 arranged concentrically adjacent therewith and with the column 24 and arranged to engage complementary portions of the cradle-balance for the normal support and accurate centering thereof relative to column 24 when the cradle is in its position of disuse or inoperation.

It is essential that the clearance of mandrel 26 about column 24 be approximately uniform when the cradle is in balancing position, and this is accomplished by interengaging portions 49 and 50 which properly center the parts whenever the cross-head 47a is raised. Upon lowering of the same the clearance is accurately maintained, and the ball deposited centrally on top of the column. No other guiding means is relied upon or necessary.

The cradle-balance 23 may be locked in its protected position of inoperation by means of a pair of locking pins 51, 51 in operative connection with suitable controlling means such as a lock-controlling push button 52, operating the pins through the interconnecting crosshead 53, and other connections such, for example, as a ball and socket joint 54, a link 55, a ball and socket joint 56, a push rod 57, slidably arranged in handle bracket 57', and carrying the push button 52 affixed thereto.

The locking pins 51, 51 are horizontally and laterally disposed and fitting in bores 58, 58, respectively, in the front rectangular bar 40' and having endwise movement therein and adapted to register into corresponding bores or sockets 60, 60 in the beam 62 of the cradle-balance 23, whereby when it is desirous to lock the cradle in a position of disuse and thereby firmly clamp it against all movement, the push button 52, on handle 34, is manually pushed inwardly sufficiently to move the coupled locking pins 51, 51 into the aligned bores 60, 60 in the beam of the cradle, which bores are in alignment with the locking pins when the beam is seated upon its supporting crosshead 47a of the bars 40, 40'.

Similarly, when it is desirous to unlock the cradle, the locking pins 51, 51 are manually withdrawn from their engagement with the beam 62 of the cradle, by an outward pull upon the knob 52. A detent of suitable type may be provided to maintain the pins in desired positions.

A collar 63 is arranged horizontally in cradle 23 concentrically around the vertical mandrel 26 and rotatably journaled upon anti-friction bearings 64, which are, in turn, carried by the column 24, through the concentric mandrel 26 and the connected beam 62 of the cradle. The top face of the collar 63 preferably projects slightly above the top flat surface of the cradle-beam 62, so that it may engage and support a work piece mounted upon mandrel 26. The collar and its bearings permit ready rotation of even relatively heavy pieces to bring any unbalanced weight thereof opposite beam 38.

Referring to Figure 3, an automatic calculator 72, of preferably circular form and having calculator actuating means in operative connection therewith and with the base 12, is attached to the reciprocable carriage 11, as by screws 73. The calculator preferably comprises a round metal case 74, having a glass cover 75, enclosing an outer circular dial plate 76 affixed therein and having an inner, rotary, circular dial plate 77 concentric therewith, the latter being carried on a shaft 78, which is journaled concentrically in the said case 74. An arm 79, to rotate the inner dial 77, is also affixed laterally to said shaft 78. The upper surface of said arm 79 is suitably curved and carries a flexible cable 80 preferably operated in a groove 81 therefor provided. One end of the cable 80 is affixed to the arm 79, as by the screws 82, 82, and the opposite end is adjustably connected to the rib 83 of the base 12, as by an eye bolt 84. The cable 80 is passed around the guide sheaves 85 and 86 which are journaled on the carriage 11, and in the calculator 72, respectively. A coiled spring 87, attached at one end to the case 74, as by a pin 88, and at its opposite end to the rotary arm 79, as by the pin 89, urges the arm upwardly and maintains tension on said cable 80. The outer, stationary dial 76 has a plurality of concentric, logarithmic divisions to indicate, in thousandths of an inch, the depth to which the member 66 must be drilled with a selected diameter of drill, for example, ¾″, ½″ or ¼″, respectively, to balance the member. The rotary dial 77 has logarithmic divisions around its periphery, whereby, when the arm 79, which rotates dial 77, is swung through angular measurements, it transposes uniform movement of the carriage (in inches or the like) to logarithmic movement, as shown on the dials, whereas the movement of the carriage causes the calculator to automatically determine the weight of metal to be removed at any given distance from the center of work 66 when out of balance.

I will now proceed to describe the exact operation of the machine and explain its function as performed upon an ordinary flywheel 66, for illustration, and describe the novel method of truing up an unbalanced flywheel.

The procedure is as follows:—

First, referring particularly to Figure 3, the cradle-beam 62 is locked, against movement, to the horizontal bars 40, 40'.

Second, the carriage 11 is adjusted on its base 12, by hand screw 15, so that the index arm 21, affixed to the base, is in register with the zero position of travel, as indicated on the scale 19.

Third, the base of the machine is firmly clamped upon a table 68 of a drill press, in a position wherein the vertical axis of a drill 69 is in axial alignment with the axis of the mandrel 26.

Fourth, the connected parallel bars 40, 40' are adjusted horizontally above the table 29 by means of the supporting shims 44, 44, to the required level, or in some instances, the shims may be omitted and the bars may be supported directly upon the table 29.

Fifth, a flywheel 66 is placed horizontally upon the bars 40, 40' with its hub placed concentrically upon the mandrel 26, appropriate bushings, sleeves, or other means not shown in the drawings, being interposed between the mandrel and the hub bore if the latter is too large to fit the mandrel.

Sixth, the cradle-beam 62 is unlocked with respect to the bars 40, 40'.

Seventh, the vertically adjustable table 29, now supporting the flywheel 66, is lowered by slightly rotating the table, through its handle 34 or other rotating means, to a position wherein the flywheel becomes entirely supported by the cradle-balance upon the column 24, when the screw 27 is adjusted to find the point in the flywheel where it will be possible to determine the exact amount of unbalance.

Eighth, the spirit level 37 is observed to determine whether the flywheel is out of balance. The flywheel is now free to rotate upon the supporting ball bearing journaled collar 63 of the cradle-beam 62. If the flywheel is in perfect balance, no declination will be indicated by the universal spirit level 37. But, if the flywheel is out of balance, by being heavier at one part of the rim than at the remainder, the heavier part will cause a declination of the flywheel and the supporting cradle-balance, as will be clearly indicated by the spirit level 37.

Ninth, the exact spot of maximum declination of the rim of the flywheel from the horizontal is then (manually) rotated to a position on the cradle-beam, diametrically opposite that of the beam 38.

Tenth, the slidable weight 39 is moved outwardly, upon specially graduated balancing arm 38, to the position of no declination, or to an exact balance, as indicated by the spirit level indicator 37, the adjusting screw 27 having been previously positioned by experiment so the ball pivot 28 will be at or slightly above the center of gravity of the combined cradle 23 and flywheel as above explained, the shifting weight 39 having counterbalanced the unbalance and corrected the declination. The exact position of the slidable weight 39, on the scale 38, shows, in any suitable units, but preferably in inch-ounces and fractions thereof, the amount which the flywheel is out of balance.

Eleventh, the table 29 is raised sufficiently, or until the flywheel becomes again supported by the bars 40, 40′, thus taking the load off the cradle-beam 62, which is then again locked at a level slightly below the top level of the rectangular bars 40, 40′.

Twelfth, the carriage 11, which is now entirely supporting the flywheel 66, upon the bars 40, 40′ is moved longitudinally to the left with respect to its supporting base 12, by means of the carriage adjusting hand-screw 15, from its zero position of travel, Figure 1, shown on the scale 19, and from a position when the center of the flywheel is directly under the drill spindle to a distance where it is convenient to drill into the rim of the flywheel and remove an amount sufficient to produce the moment in inch-ounces as indicated on the scale beam 38 that the flywheel is out of exact balance. By referring to the automatic calculator 72 and reading opposite the inch-ounces as determined, the depth of the required bore 70 in the rim 71 of the flywheel 66 for any selected diameter of a drill 69 may be determined in thousandths of an inch, thereby finding the exact amount of metal to be drilled out of the said bore to exactly balance the flywheel. The flywheel is next drilled to the required depth thus ascertained and again supported upon the cradle 23, and if no declination thereof is indicated by the spirit level 37, the wheel is in exact balance and is then removed from the machine, the cradle first being locked to the bars 40, 40′ to prevent movement and possible damage thereof.

Obviously dials 76 and 77 may be made replaceable with others of different values in order to give correct readings of drill depths for materials of different densities.

It is understood that the embodiment of the invention set forth herein is only one of the many embodiments or forms the invention may take, and I do not wish to be limited in the practice of the invention to the particular embodiment set forth except as I may be limited by the terms of the appended claims, and I may use any feature of my invention without any one or more of the other features.

Having described my invention what I claim is:

1. A static balancing machine, comprising a base, a carriage horizontally slidable on said base, a vertically adjustable table supported from said carriage, a work rest frame supported from said table, means for guiding said frame for upward movement relatively to said carriage, a column fixed with said carriage and extending vertically therefrom and a balancing cradle fulcrumed on said column, said frame being positioned to engage a work piece when raised and to relieve the fulcrum of the weight thereof.

2. A static balancing machine, comprising a base, a carriage horizontally slidable on said base, a table and work rest frame vertically movable and guided for such movement on said carriage, means for guiding said frame from said carriage, a column on said carriage, and a balancing cradle fulcrumed thereon, and means on said cradle for shifting the center of gravity thereof for vertically aligning the center of gravity of the combined cradle and work with the fulcrum element during balancing procedure.

3. A static balancing machine, comprising a base, a carriage slidably mounted on said base and having circular spiral cam segments, a rotatable table having corresponding cam segments fixed therewith and adapted to be moved relatively to the first mentioned segments by rotation of said table to alter the effective height of said table, means for manual rotation of said table, work rest bars carried by said table and adapted to support a work piece when said table is raised by rotation thereof, locking pins slidable in one of said work rest bars, a balancing cradle rockably mounted between said bars and having holes in position to receive said locking pins to lock said cradle against rocking movement, and means for operating said pins.

4. A static balancing machine, comprising a base, a horizontally slidable work positioning carriage on said base, a table and work rest frame guided for vertical movement on said carriage, means for guiding said frame on said carriage, a column fixed on said carriage and having a flat top, a balancing cradle having an anti-friction ball fulcrum interposed between it and said flat top, interengaging portions on said cradle and said work rest frame operative when said frame is raised to center said ball fulcrum over said flat top.

5. A static balancing machine, comprising a base, a horizontally slidable work positioning carriage on said base, a table supported from said carriage and adjustable vertically relatively thereto, a work rest frame supported from said table and guided for up and down movement relative to said carriage, means for guiding said frame from said carriage, and a plurality of removable aligned spacer bars intermediate said table and said rest frame and arranged to support said frame from said table, said carriage having means for supporting a balancing cradle.

6. A static balancing machine, comprising a base, a work positioning carriage slidably guided on said base for horizontal movement relative thereto, a lead screw positioned and rotative in said carriage and operatively connected to drive said carriage, actuating means for said screw for reciprocating said carriage on said base, a table supported by said carriage and having a predetermined guided up and down movement, means for guiding said table, work rest members supported on said table and guided for vertical movement by said carriage, a fulcrum bearing on said carriage and a balancing cradle supported for rocking movement on said bearing and between said work rest members.

7. A static balancing machine, comprising a base, a calculator actuating means attached to said base, a work positioning carriage slidable on said base, a calculator attached to said carriage and connected to said actuating means to be actuated by displacement of said carriage, a fulcrum bearing positioned on said carriage, and a balancing cradle supported on said bearing for rocking movement relative to said carriage, and means on said cradle for positioning a work piece thereon.

8. A static balancing machine, comprising a base having an actuator arranged to convert a uniform movement to a logarithmic movement attached thereto, a working positioning carriage horizontally slidable on said base, a logarithmic automatic calculator fixed on said carriage and connected to said actuator, a table and work rest frame positioned on said carriage and vertically adjustable relatively thereto, a supporting means on said carriage, and a balancing cradle supported on said means for rocking movement relative to said carriage, said frame being arranged to engage a work piece fixed with said cradle and relieve said supporting means of the weight thereof.

9. In a balancing machine the combination of a cradle member having means for fixing thereon a work piece suspected of being unbalanced, a fulcrum supporting said cradle and permitting free tilting thereof, said means being arranged to fix a work piece with said cradle in a predetermined position such that unbalanced weight in said work piece will cause tilting of said cradle, means on said cradle for detecting such tilting, means for measuring the unbalanced weight responsible for such tilting including a weight movable to level said cradle while such unbalanced work piece is in place, said weight operating to indicate in suitable units from the position to which it is moved the moment of said unbalanced weight, mechanism for shifting said cradle and work piece measured amounts from an original position, and a calculating instrument actuated by such shifting and operable to calculate and indicate, for various convenient distances from said original position, the amount of material which must be removed from said work piece at such distance to destroy said moment and balance said work piece.

10. A device as set forth in claim 9 in which the calculating instrument indicates in terms of depth of drilling necessary with various sizes of drills to remove the necessary amount of material.

11. In a balancing machine the combination of a support element and a column element extending substantially vertically relatively to said support element, said elements being relatively movable in a substantially vertical direction, a balancing cradle supported from said column for tilting movement relatively thereto, means for supporting a work piece on said cradle, a levelling device on said cradle and operative to detect tilting thereof, a fulcrum bearing for said cradle positioned to rest on said column and operative upon relative movement of said elements in one direction to support said cradle for said tilting movement, and means on said support element operative upon relative movement of said elements in the opposite direction to support said work piece independently of said cradle.

12. In a balancing machine the combination of a fulcrum bearing, a cradle supported on said fulcrum and arranged for tilting movement in all directions, means for positioning a rotative work piece on said cradle with its axis passing vertically through the fulcrum point on which said cradle is supported when said cradle is level, means for detecting the direction of tilting of said cradle, a weighing beam projecting from said cradle in a substantially horizontal direction, a weight slidable on said beam, and an anti-friction bearing on said cradle and positioned to support said work piece from said cradle for rotation about said axis, whereby said piece may be rotated on said cradle to locate any unbalanced weight therein opposite said beam and in a vertical plane containing said beam, said fulcrum point and said unbalanced weight.

13. A static balancing machine, comprising a base element, a work positioning carriage element horizontally slidable on said base element, graduations on one of said elements and a pointer on the other of said elements, said graduations coacting with said pointer to indicate the distance from an original position through which a work piece has been moved to a desired location for removing unbalanced material from said work piece, a balancing cradle positioned on said carriage, and constituted to carry a work piece, and means operatively connected to said balancing cradle to indicate lack of balance in said work piece.

14. In a balancing machine a base, a column rising vertically from said base, a work rest frame supported from said base, and arranged for vertical movement relatively to said column, a balancing cradle pivoted on said column and arranged for tilting movement thereon in all directions, said cradle being constituted to support a workpiece for balancing, and said work rest frame being proportioned so as, upon said relative vertical movement, to engage said work piece and relieve said cradle of the weight thereof, and to engage said cradle and relieve said column of the weight of said cradle.

JOHN LEONARD TAYLOR.